(12) United States Patent
Michael et al.

(10) Patent No.: US 7,830,043 B1
(45) Date of Patent: Nov. 9, 2010

(54) ADAPTABLE COMPUTER RACK FOR POWER DISTRIBUTION

(75) Inventors: Amir Michael, Foster City, CA (US); William Leslie Dailey, Emerald Hills, CA (US); Ken Krieger, Jackson, WY (US)

(73) Assignee: Google Inc., Mountain View, CA (US)

( * ) Notice: Subject to any disclaimer, the term of this patent is extended or adjusted under 35 U.S.C. 154(b) by 174 days.

(21) Appl. No.: 12/274,983

(22) Filed: Nov. 20, 2008

(51) Int. Cl.
*H05K 7/14* (2006.01)

(52) U.S. Cl. .................................................. 307/149

(58) Field of Classification Search .................. 307/149
See application file for complete search history.

(56) References Cited

U.S. PATENT DOCUMENTS

2006/0119993 A1* 6/2006 Menas et al. .................. 361/18

* cited by examiner

*Primary Examiner*—Robert L. DeBeradinis
(74) *Attorney, Agent, or Firm*—Brake Hughes Bellermann LLP (57) ABSTRACT

A system may include a rack that is configured to receive electrical power from a power distribution box and to distribute the electrical power to one or more electrical loads. The system may include at least one power strip having a first circuit and a second circuit that are mounted in the rack. The first circuit may include outlets into which the electrical loads are connected and a first portion of a connector interface. The second circuit may include an enclosure that houses an electrical configuration including at least one power cord that is coupled to the power distribution box and a second portion of the connector interface that is configured to couple the second circuit to the first circuit by mating with the first portion of the connector interface, where the second circuit is removable from the rack and interchangeable with other second circuits that comprise different electrical configurations.

20 Claims, 7 Drawing Sheets

ADAPTABLE COMPUTER RACK FOR POWER DISTRIBUTION

TECHNICAL FIELD

This description relates to an adaptable computer rack for power distribution.

BACKGROUND

Computer racks may use power strips to distribute power to electrical loads contained in the computer rack. For example, a server rack may be configured to use power strips to distribute power to individual servers and other computer components contained in the server rack. The amount of power delivered by a power strip may be limited by constraints of the power strip such as, for example, fuses, number of cables, plugs, outlets and the like. In situations where the power draw of the load exceeds the capacity of the power strip, then measures need to be taken to meet the power demand such as, for example, by adding additional power strips or by replacing the power strip with a power strip having a higher capacity.

Power strips may draw power from more than one electrical phase. For example, the power strips may draw power from one of three phases of power being supplied to the power strips. The power strips may enable the connected electrical loads (e.g., servers or other components) to draw power from a single electrical phase by connecting each phase to a set of outlets. It may be desirable to distribute the electrical loads evenly across all phases supplying power to the computer rack. It is possible to draw power unevenly from each electrical phase, an undesirable condition, by connecting more electrical loads to outlets driven by a particular phase while connecting less electrical loads to outlets driven by a different phase.

Consequently, it may be desirable to have a system that makes it easier and more convenient (i.e., less time consuming and therefore more cost efficient) to balance the electrical load across all phases and to make equipment adjustments in a timely, and cost efficient manner.

SUMMARY

According to one general aspect, a system may include a rack that is arranged and configured to receive electrical power from a power distribution box and to distribute the electrical power to one or more electrical loads. The system may include at least one power strip that includes a first circuit that is mounted in the rack and a second circuit that is mounted in the rack. The first circuit may include one or more outlets into which the electrical loads are connected and a first portion of a connector interface. The second circuit may include an enclosure that houses an electrical configuration including at least one power cord that is operatively coupled to the power distribution box and a second portion of the connector interface that is configured to couple the second circuit to the first circuit by mating with the first portion of the connector interface, where the second circuit is removable from the rack and interchangeable with other second circuits that comprise different electrical configurations.

Implementations may include one or more of the following features. For example, the enclosure of the second circuit may be configured to slide into the rack and the second portion of the connector interface may be configured to mate blindly with the first portion of the connector interface. The rack may include guide rails that are configured to guide the enclosure of the second circuit in the rack and latches that are configured to secure the enclosure in the rack.

In one exemplary implementation, the connector interface may include a universal, multi-circuit connector. The first circuit may be mounted in the rack and the second circuit may be slidably removable from the rack. The outlets in the first circuit may include multiple conductors that are electrically connected to respective terminals on the first portion of the connector interface and the second circuit may include multiple power cords that each supply a different electrical phase to the outlets through the connector interface.

The second circuit may include one or more fuses. The second circuit may be interchangeable with another second circuit that includes multiple power cords and having a different electrical phase configuration. The second circuit may be removable from the rack and interchangeable with other second circuits without the use of tools.

In another general aspect, an apparatus may include a first circuit that is configured to be mounted in a rack and that includes one or more outlets into which electrical loads are connected and a first portion of a connector interface. The apparatus may include a second circuit that configured to be removable mounted in the rack and that includes an enclosure that houses an electrical configuration including at least one power cord that is configured to be operatively coupled to a power distribution box and a second portion of the connector interface that is configured to couple the second circuit to the first circuit by mating with the first portion of the connector interface, where the second circuit is interchangeable with other second circuits that comprise different electrical configurations.

Implementations may include one or more of the following features. For example, the enclosure of the second circuit may be configured to slide into the rack and the second portion of the connector interface may be configured to mate blindly with the first portion of the connector interface. The connector interface may include a universal, multi-circuit connector. The first circuit may be configured to be mounted in the rack and the second circuit may be configured to be slidably removable from the rack.

In one exemplary implementation, the outlets in the first circuit may include multiple conductors that are electrically connected to respective terminals on the first portion of the connector interface and the second circuit may include multiple power cords that each supply a different electrical phase to the outlets through the connector interface.

The second circuit may include one or more fuses. The second circuit may be interchangeable with another second circuit that includes multiple power cords and having a different electrical phase configuration. The second circuit may be configured to be removable from the rack and interchangeable with other second circuits without the use of tools.

In another general aspect, a method may include receiving, from a power distribution box, electrical power at a second circuit of a power strip, where the second circuit is a modular component capable of having different electrical configurations and distributing the received electrical power to a first circuit of the power strip through a connector interface, where the first circuit includes one or more outlets into which electrical loads are connected.

Implementations may include one or more of the following features. For example, the method may include changing a distribution of the electrical power to the electrical loads by replacing the second circuit with another second circuit having a different electrical configuration. The connector interface may include a universal, multi-circuit connector.

The details of one or more implementations are set forth in the accompanying drawings and the description below. Other features will be apparent from the description and drawings, and from the claims.

DETAILED DESCRIPTION

This document describes a system, an apparatus and techniques for distributing power to electrical loads. The system may include a rack that provides power to electrical loads and at least one power strip that includes a first circuit and a second circuit. The first circuit may include power outlets into which the electrical loads may be plugged and the first circuit may be fixed in the rack. The second circuit may be a modular unit that mates with the first circuit and includes an electrical configuration for delivering power to the first circuit and to the electrical loads that may be connected to the first circuit. The second circuit is modular and removable from the rack and is interchangeable with another second circuit that may have a different electrical configuration that connects to the first circuit in the same manner and delivers power to the first circuit and to the electrical loads, but uses a different electrical configuration to do so.

Figure 1:
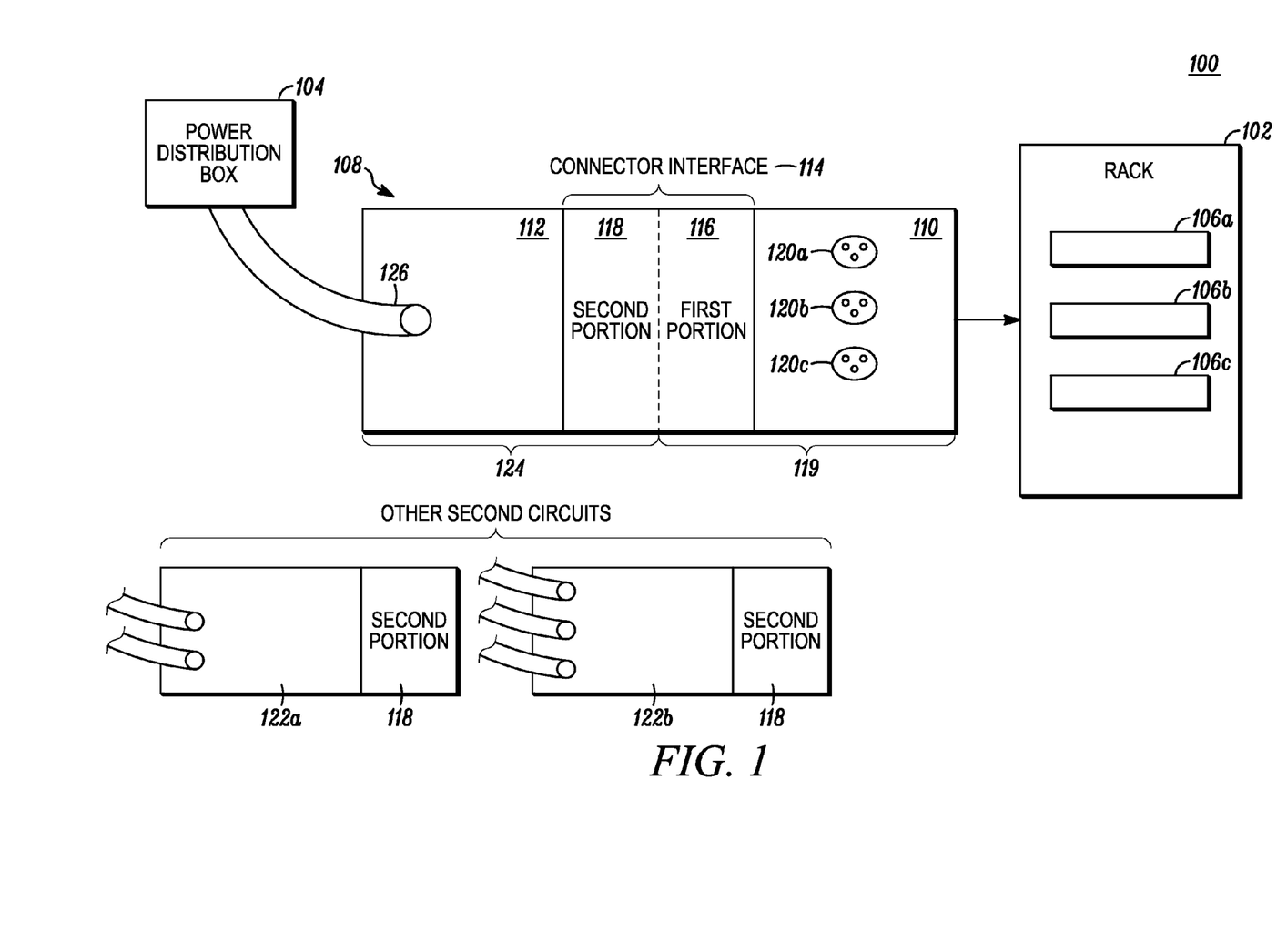
FIG. 1 is an exemplary block diagram of a system for power distribution.

FIG. 1 is an exemplary block diagram of a system 100 for power distribution. The system 100 includes a rack 102 that is arranged and configured to receive electrical power from a power distribution box 104 and to distribute the electrical power to one or more electrical loads 106a-106c. The rack 102 may be referred to interchangeably throughout this document as a computer rack or a server rack. The rack 102 includes a physical structure that is configured to house one or more electrical loads 106a-106c. The electrical loads 106a-106c may include various types of components such as, for example, servers, computers, other computing devices, telecommunications devices, audio/video devices and other equipment that is configured to be placed in a rack. The electrical loads 106a-106c may be referred to as or otherwise described as rack mountable, a rack mount, a submount or simply as a shelf. The rack 102 may be configured to enable the electrical loads 106a-106c to be connected to each other and multiple racks 102 may be placed near each other to enable different configurations and connections of the electrical loads 106a-106c, such as in a data center.

The rack 102 may be configured to enable electrical power from the power distribution box 104 to be provided to the electrical loads 106a-106c. The power distribution box 104 may supply different types of power to the rack 102 such as, for example, single-phase power, two-phase power, three-phase power, and/or direct current (DC) power. The rack 102 may include one or more power strips 108 that are arranged and configured to electrically connect to the power distribution box 104 and that are arranged and configured to electrically connect to the electrical loads 106a-106c.

The power strip 108 may be divided into two parts or two circuit sections. Specifically, the power strip 108 may include a first circuit 110 and a second circuit 112. The first circuit 110 and the second circuit 112 electrically connect together at a connector interface 114, where the first circuit 110 includes a first portion 116 of the connector interface 114 and the second circuit 112 includes a second portion 118 of the connector interface 114.

The first circuit 110 may be configured to include an enclosure 119 that houses one or more outlets 120a-120c into which the electrical loads 106a-106c may be connected. The enclosure 119 also may house the first portion 116 of the connector interface 114. The outlets 120a-120c may be configured to enable the electrical loads 106a-106c to be plugged into the outlets 120a-120c and/or the outlets 120a-120c may be configured to enable the electrical loads 106a-106c to be hard wired into the outlets 120a-120c. The outlets 120a-120c may include multiple conductors such as, for example, a line conductor, a neutral conductor and a ground conductor. The conductors in the outlets 120a-120c may be electrically connected to terminals in the first portion 116 of the connector interface 114.

In one exemplary implementation, the first circuit 110 may be permanently mounted in the rack 102. In this manner, the electrical loads 106a-106c may be installed in the rack 102 and electrically connected to the outlets 120a-120c of the first circuit 110. In another exemplary implementation, the first circuit 110 may be mounted in the rack 102 using one or more fasteners (e.g., thumbscrews) such that the first circuit 110 may be removed.

The second circuit 112 may be a modular component of the power strip 108 that can be configured to include different electrical configurations. The second circuit 112 may be configured to be removable from the rack 102 and interchanged with other second circuits (e.g., other second circuits 122a-122b), which may be the same modular-type component but have a different electrical configuration. In one exemplary implementation, the second circuit 112 may be slidably removable from the rack 102 and may be interchanged with the other second circuits 122a-122b without the use of any tools. The rack 102 may include guide rails and the second circuit 112 may be configured to slide on the guide rails with mechanical levers such as, for example, latches that hold the second circuit in place in the rack 102. Thus, to reconfigure the electrical power distribution from the power distribution box 104 to the electrical loads 106a-106c, an electrician may not be required.

The second circuit 112 may be configured to include an enclosure 124 that houses an electrical configuration including at least one power cord 126 that is electrically connected to the power distribution box 104. The enclosure 124 also may be configured to house the second portion 118 of the connector interface 114.

In one exemplary implementation, the connector interface 114 is a universal, multi-circuit connector. The connector interface 114 may be configured to enable the first circuit 110 and the second circuit 112 to mate and provide an electrical connection between the two circuits that make up the power strip 108. The first portion 116 and the second portion 118 of the connector interface 114 may be configured such that when the second circuit 112 is slid into the rack 102, the second portion 118 mates blindly with the first portion 116 of the connector interface 114. In this manner, there is no alignment that is required to connect the two circuits and the second circuit 112 may simply be slid into the rack 102 and mate with the first circuit 110.

The second circuit 112 may be configured with different electrical configurations and with different numbers and/or types of power cords 126. Although the second circuit 112 is shown as having a single power cord 126, it may very well be configured to have two, three or more power cords such as shown by the other second circuits 122a-122b. The back end of the enclosure 124 may be configured and modifiable to accept differing amounts and types of power cords. The single power cord 126 may represent that single phase power is being provided from the power distribution box 104 to the electrical loads 106a-106c. The power cords may include different types of power cords to meet the appropriate electrical standard for a particular region. Each power cord may represent a different phase of power that is being supplied to the electrical loads 106a-106c in the rack 102.

The different electrical configurations for the second circuit 112 may enable the fusing and phase distribution scheme to be changed in a modular manner, while the first circuit 110 remains unchanged and fixed in the rack 102. Examples of different electrical configurations for the second circuit 112 are illustrated and described in more detail below with respect to FIGS. 2-4.

To change the power distribution for the electrical loads 106a-106c, the second circuit 112 may be removed and interchanged with one of the other second circuits 122a-122b. The other second circuits 122a-122b include the same second portion 118 of the connector interface that enables the circuits to mate with the first circuit 110. The first circuit 110 remains in the rack 102 and the electrical loads 106a-106c may remain plugged into the outlets 120a-120c. For example, the second circuit 112 may be configured to supply single phase power to the electrical loads 106a-106c. It may be desirable to supply three phase power to the electrical loads 106a-106c. One of the other second circuits such as, for example, second circuit 122b may be configured to distribute three phase power because it may be configured with three power cords and the electrical configuration may include a configuration to distribute the three phase power. The second circuit 112 is simply disconnected from the first circuit 110 (e.g., by pulling the enclosure 124 out of the rack 102). The power cord 126 is disconnected from the power distribution box 104 and the power cords from the other second circuit 122b are connected to the power distribution box 104. The other second circuit 122b is then inserted into the rack 102 until the second portion of the connector interface mates with the first portion 116 of the connector interface 114. Although two other second circuits 122a-122b are illustrated, there may be many more other second circuits that have different electrical configurations.

Figure 2:
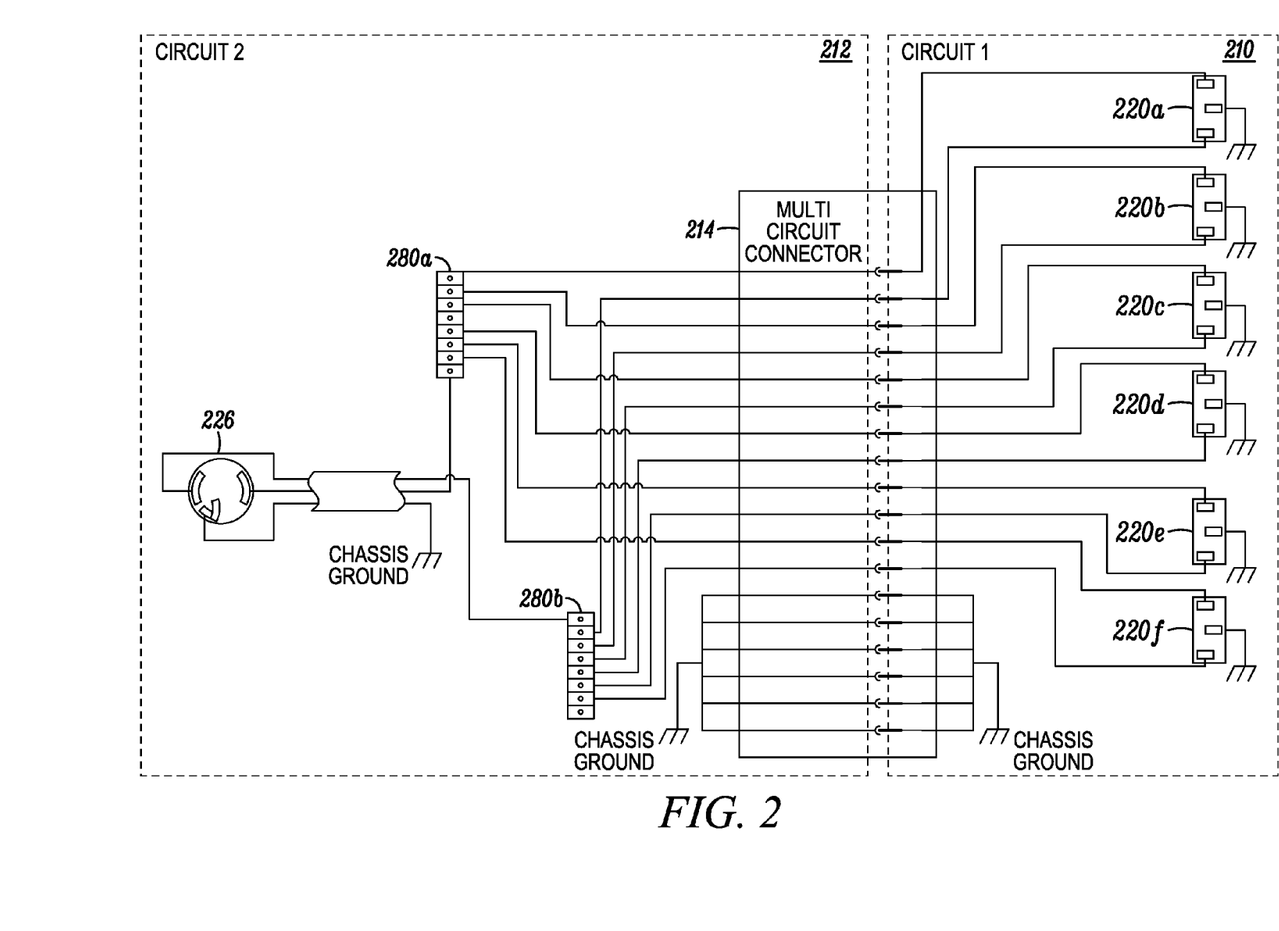
FIG. 2 is an exemplary circuit diagram of the power strip of FIG. 1.
Figure 3:
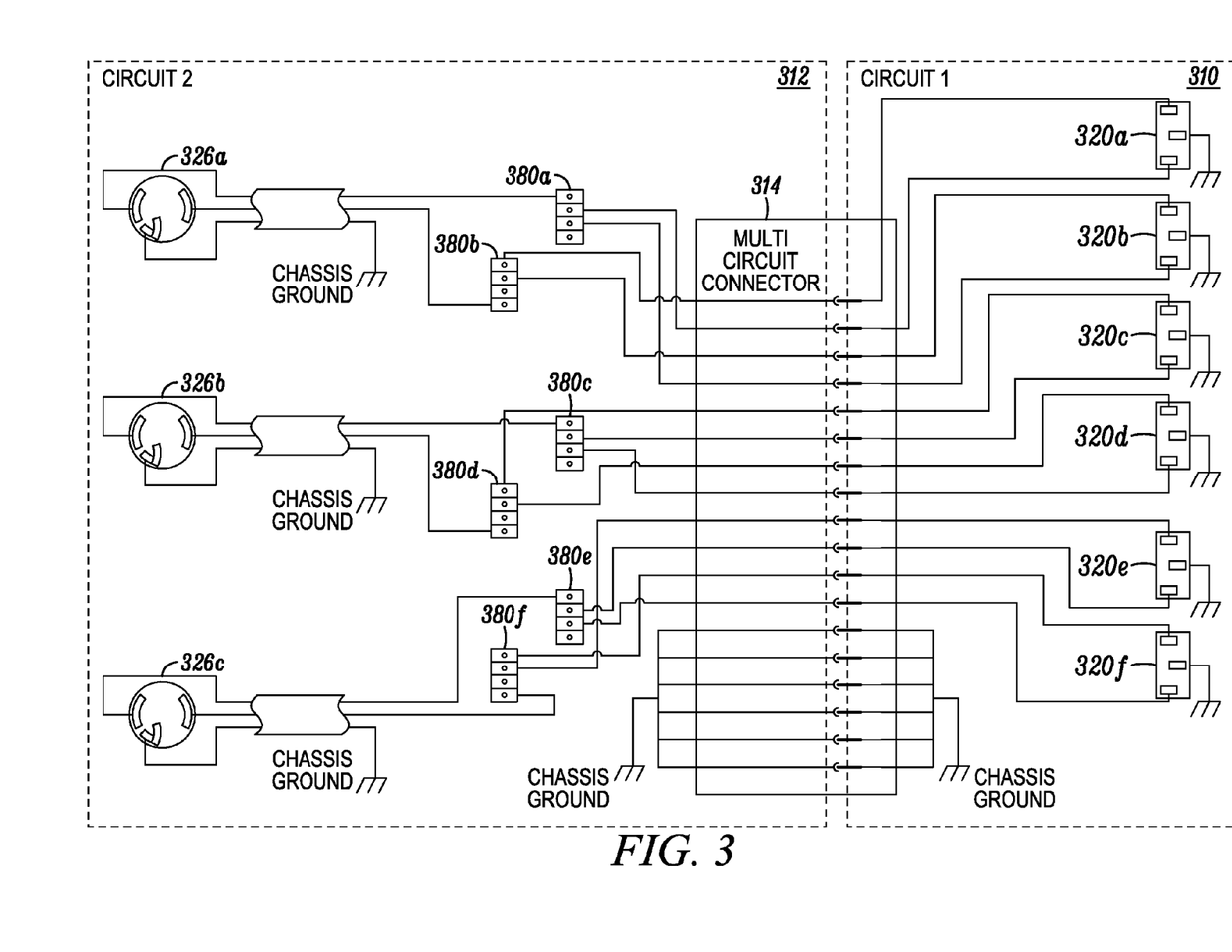
FIG. 3 is an exemplary circuit diagram of the power strip of FIG. 1.
Figure 4:
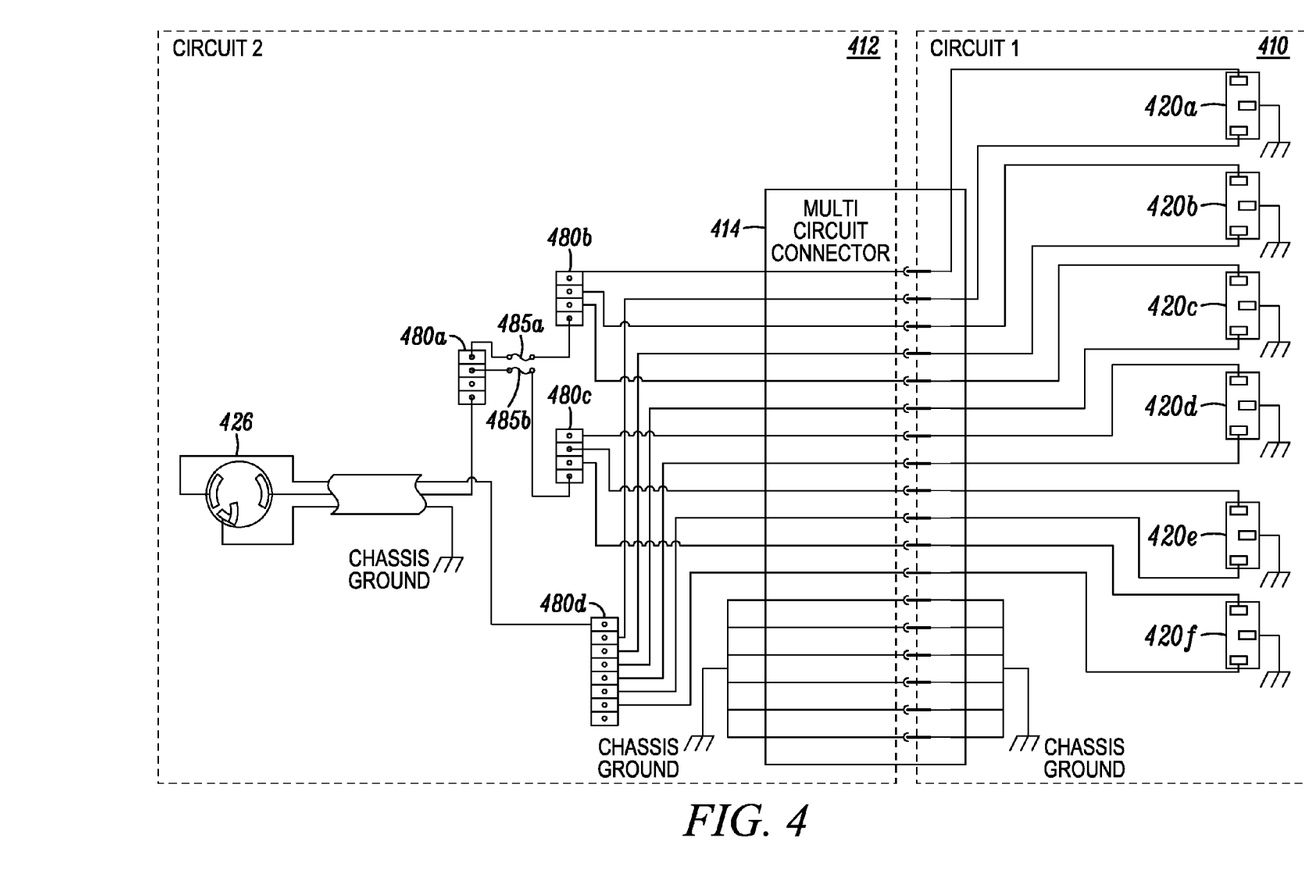
FIG. 4 is an exemplary circuit diagram of the power strip of FIG. 1.

Referring to FIGS. 2-4, different example electrical configurations for the second circuit are illustrated. At the same time, the first circuit remains the same and remains mounted in the rack. FIG. 2 illustrates a first circuit 210 having six outlets 220a-220f and a second circuit 212 having a single cord 226. As discussed above with respect to FIG. 1, the first circuit 210 may be permanently mounted in a rack and up to six electrical loads may be plugged into or otherwise wired into the six outlets 220a-220f.

The connector interface 214, which is illustrated in this example as a multi-circuit connector, enables the second circuit 212 to electrically connect to the first circuit 210. The electrical configuration of the second circuit 212 includes a single cord 226, which may be configured to provide single phase power to the outlets 220a-220f, and two distribution blocks 280a-280b, which may be configured to distribute the incoming power on the power cord 226 to the appropriate terminals in the connector interface 214, which ultimately provide power to the outlets 220a-220f.

As discussed above, in one exemplary implementation, it may be desirable or necessary to change the power distribution to the electrical loads plugged into the outlets 220a-220f. To change the power distribution to the first circuit 210, no changes to the first circuit 210 need to be made. Instead, the changes may be made by disconnecting the second circuit 212 and inserting another second circuit having the desired electrical configuration.

Referring to FIG. 3, in one exemplary implementation, second circuit 312 may replace second circuit 212 with the desired electrical configuration. In FIG. 3, the first circuit 310 is the same circuit as first circuit 210 of FIG. 2. The first circuit 310 includes the same six outlets 320a-320f that are electrically connected in the same manner to terminals of the connector interface 314.

Instead, the second circuit 312 includes a different electrical configuration than the second circuit 212 of FIG. 2. The second circuit 312 includes three power cords 326a-326c, which may provide three phase power to the first circuit 310, instead of the single phase power that was provided by the second circuit 212. The second circuit 312 includes six distribution blocks 380a-380f to distribute the three phase power to the appropriate terminals in the connector interface 314, which is illustrated as a multi-circuit connector. The connector interface 314 is the same connector interface 314 as connector interface 214 of FIG. 2.

In this manner, more flexibility is provided to users when the electrical loads in a rack or even the electrical loads in a data center need to be balanced. The modularity of the second circuits (e.g., second circuit 212 of FIG. 2 and second circuit 312 of FIG. 3) provides the flexibility to more easily change the electrical distribution to the electrical loads and to provide an easier means to balance the electrical loads among the different phases of power that may be provided in a data center.

Referring to FIG. 4, another example of a second circuit 412 having a different electrical configuration is illustrated. The first circuit 410 is the same first circuit as the first circuits 210 and 310 and includes the same six outlets 420a-420f. Similarly, the connector interface 414 remains the same. The second circuit 412 has a different electrical configuration than second circuits 212 and 312 of FIGS. 2 and 3, respectively. In FIG. 4, the second circuit 412 includes a single power cord 426, four distribution blocks 480a-480d and two fuses 485a-485b. The distribution blocks 480a-480d may be configured to deliver power from the power cord 426 to the connector interface 414 and ultimately to the outlets 420a-420f in a desired configuration. The fuses 485a-485b provide protection to the circuits and to the electrical loads plugged into the outlets 420a-420f in a desired manner.

Figure 5:
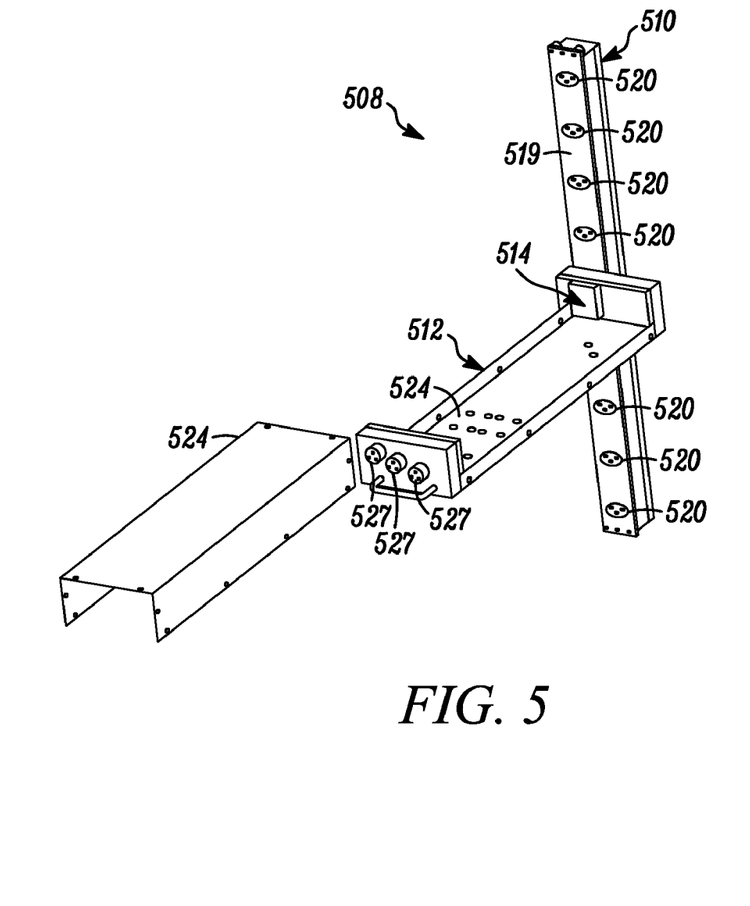
FIG. 5 is an exemplary block diagram of the power strip of FIG. 1.

Referring to FIG. 5, an exemplary block diagram of the power strip of FIG. 1 is illustrated. As illustrated in FIG. 5, a power strip 508 may be divided into two parts or two circuit sections. Specifically, the power strip 508 may include a first circuit 510 and a second circuit 512. The first circuit 510 and the second circuit 512 electrically connect together at a connector interface 514, where the connector interface may be a blind mate connector. This example illustration shows the first circuit 510 and the second circuit 512 connected together.

In one exemplary implementation, the first circuit may include an enclosure 519 that houses multiple outlets 520. The outlets 520 also may be blind mate connectors and may be configured to supply AC or DC power to one or more electrical loads (not shown), which may be plugged into the outlets.

The second circuit 512 may be a modular component of the power strip 508 that is configurable to include different electrical configurations. Thus, when an electrical configuration change to the electrical loads plugged into the first circuit 510 is desired or need, the second circuit 512 can be unplugged from the first circuit 510 and replaced with a different second circuit having the desired electrical configuration. The second circuit 512 includes an enclosure 524 that houses the electrical configuration (not shown) including at least one power cord. In this example, the enclosure 524 includes three inlets 527 for three power cords, which may be connected to a power distribution box. The three inlets may provide access for three single phases of AC power to be provided to the electrical loads.

Figure 6:
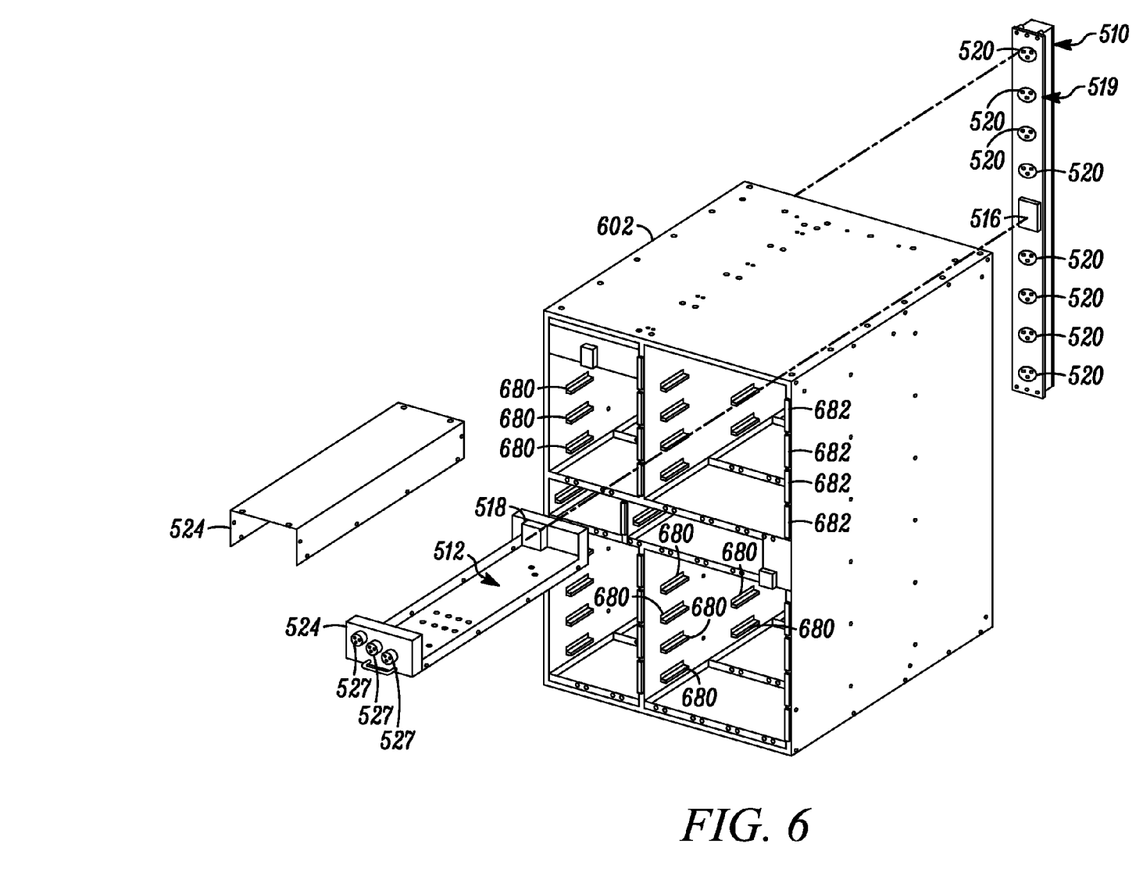
FIG. 6 is an exemplary block diagram of the power strip and rack of FIG. 1.

Referring also to FIG. 6, an example block diagram of the power strip and rack of FIG. 1 is illustrated. FIG. 6 illustrates a rack 602 that may be configured to house multiple electrical loads such as, for example, servers or other computing equipment. The first circuit 510 may be permanently mounted in the rack 602, such that electrical loads may be slid into the rack 602 and plugged in to the first circuit 510.

In this example, the first circuit 510 and the second circuit 512 are not plugged in together. The first circuit 510 includes a first portion 516 of the connector interface and the second circuit 512 includes a second portion 518 of the connector interface, which is the point where the two circuits mate to connect together electrically.

The rack 602 includes multiple guide rails 680 to enable the electrical loads and the second circuit 512 to slide into the rack 602 and to connect with the first circuit 510. The rack 602 also may include one or more latches 682 that secure the electrical loads and the second circuit 512 into place in the rack 602. In this manner, different electrical configuration can be achieved by switching out the second circuit with another second circuit all without the use of tools.

The second circuit 512 may be configured to be slidably removable from the rack 602. In this manner, the second circuit 512 may be switched out with other second circuits having a different electrical configuration.

Figure 7:
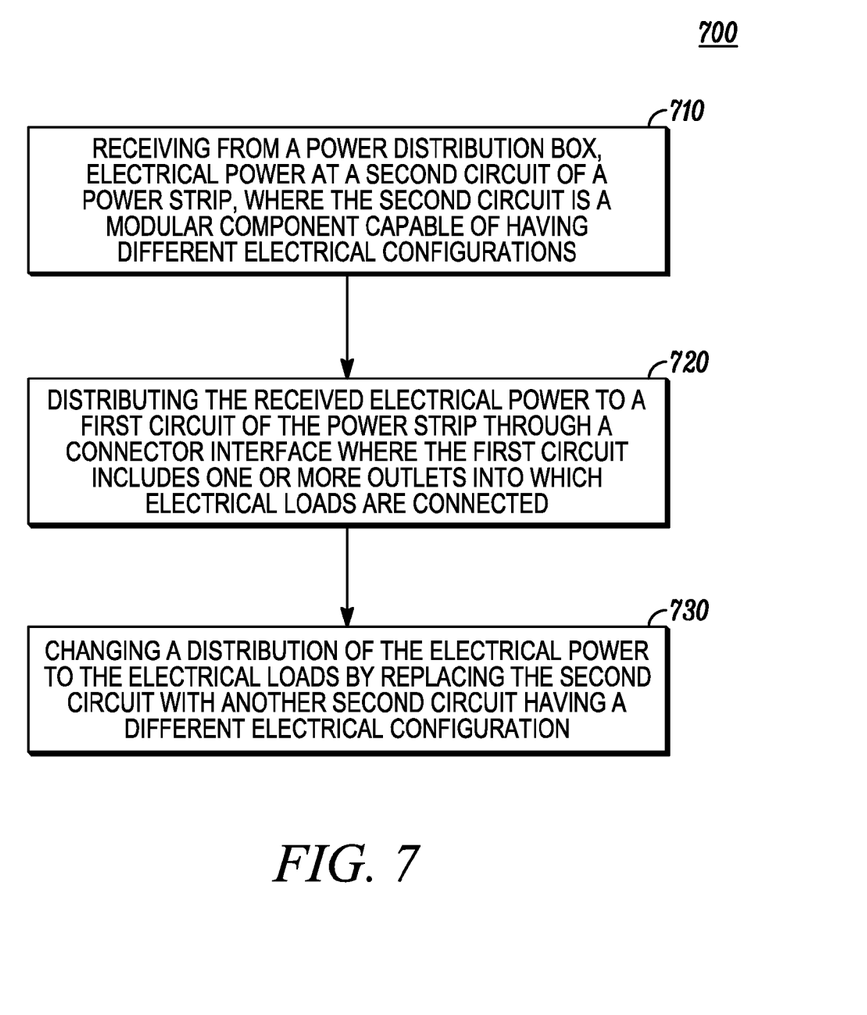
FIG. 7 is an exemplary flowchart illustrating example operations of the system of FIG. 1.

Referring to FIG. 7, an exemplary process 700 illustrates providing electrical power to one or more electrical loads. Process 700 includes receiving, from a power distribution box, electrical power at a second circuit of a power strip, where the second circuit is a modular component that is capable of having different electrical configurations (710) and distributing the received electrical power to a first circuit of the power strip through a connector interface, where the first circuit includes one or more outlets into which electrical loads are connected (720).

For example, with reference to FIG. 1, electrical power may be received from a power distribution box 104 at a second circuit 112 of a power strip 108. The second circuit 112 is a modular component that may be interchanged with other second circuits (e.g., other second circuits 122a-122b), which may have electrical configurations that are different from the electrical configuration of the second circuit 112 (710). The received electrical power is distributed to a first circuit 110 of the power strip 108 through a connector interface 114, where the first circuit 110 includes outlets 120a-120c into which electrical loads 106a-106c may be plugged (720).

Process 700 also may include changing a distribution of the electrical power to the electrical loads by replacing the second circuit with another second circuit having a different electrical configuration. For example, the distribution of the power to the electrical loads 106a-106c may be changed by replacing the second circuit 112 with one of the other second circuits 122a-122b (730). In this manner, the first circuit 110 may remain unchanged and left in tact in a server rack (e.g., server rack 102) such that the electrical loads 106a-106c do not need to be unplugged from the first circuit 110. Instead, only the modular second circuit 112 of the power strip 108 needs to be changed by simply unplugging it from the first circuit 110 and plugging in one of the other second circuits 122a-122b.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system, comprising:
   a rack that is arranged and configured to receive electrical power from a power distribution box and to distribute the electrical power to one or more electrical loads; and
   at least one power strip comprising:
      a first circuit that is mounted in the rack and that comprises:
         one or more outlets into which the electrical loads are connected, and
         a first portion of a connector interface; and
      a second circuit that is mounted in the rack and that comprises:
         an enclosure that houses an electrical configuration including at least one power cord that is operatively coupled to the power distribution box, and
         a second portion of the connector interface that is configured to couple the second circuit to the first circuit by mating with the first portion of the connector interface,
      wherein the second circuit is removable from the rack and interchangeable with other second circuits that comprise different electrical configurations.

2. The system of claim 1 wherein the enclosure of the second circuit is configured to slide into the rack and the second portion of the connector interface is configured to mate blindly with the first portion of the connector interface.

3. The system of claim 2 wherein the rack comprises guide rails that are configured to guide the enclosure of the second circuit in the rack and latches that are configured to secure the enclosure in the rack.

4. The system of claim 1 wherein the connector interface comprises a universal, multi-circuit connector.

5. The system of claim 1 wherein the first circuit is mounted in the rack and the second circuit is slidably removable from the rack.

6. The system of claim 1 wherein:
   the outlets in the first circuit comprise multiple conductors that are electrically connected to respective terminals on the first portion of the connector interface; and
   the second circuit comprises multiple power cords that each supply a different electrical phase to the outlets through the connector interface.

7. The system of claim 6 wherein the second circuit further comprises one or more fuses.

8. The system of claim 6 wherein the second circuit is interchangeable with another second circuit that comprises multiple power cords and having a different electrical phase configuration.

9. The system of claim 1 wherein the second circuit is removable from the rack and interchangeable with other second circuits without the use of tools.

10. An apparatus, comprising:
a first circuit that is configured to be mounted in a rack and that comprises:
one or more outlets into which electrical loads are connected, and
a first portion of a connector interface; and
a second circuit that configured to be removable mounted in the rack and that comprises:
an enclosure that houses an electrical configuration including at least one power cord that is configured to be operatively coupled to a power distribution box, and
a second portion of the connector interface that is configured to couple the second circuit to the first circuit by mating with the first portion of the connector interface,
wherein the second circuit is interchangeable with other second circuits that comprise different electrical configurations.

11. The apparatus of claim 10 wherein the enclosure of the second circuit is configured to slide into the rack and the second portion of the connector interface is configured to mate blindly with the first portion of the connector interface.

12. The apparatus of claim 10 wherein the connector interface comprises a universal, multi-circuit connector.

13. The apparatus of claim 10 wherein the first circuit is configured to be mounted in the rack and the second circuit is configured to be slidably removable from the rack.

14. The apparatus of claim 10 wherein:
the outlets in the first circuit comprise multiple conductors that are electrically connected to respective terminals on the first portion of the connector interface; and
the second circuit comprises multiple power cords that each supply a different electrical phase to the outlets through the connector interface.

15. The apparatus of claim 14 wherein the second circuit further comprises one or more fuses.

16. The apparatus of claim 14 wherein the second circuit is interchangeable with another second circuit that comprises multiple power cords and having a different electrical phase configuration.

17. The apparatus of claim 10 wherein the second circuit is configured to be removable from the rack and interchangeable with other second circuits without the use of tools.

18. A method comprising:
receiving, from a power distribution box, electrical power at a second circuit of a power strip, wherein the second circuit is a modular component capable of having different electrical configurations; and
distributing the received electrical power to a first circuit of the power strip through a connector interface, wherein the first circuit includes one or more outlets into which electrical loads are connected.

19. The method as in claim 18 further comprising changing a distribution of the electrical power to the electrical loads by replacing the second circuit with another second circuit having a different electrical configuration.

20. The method as in claim 18 wherein the connector interface comprises a universal, multi-circuit connector.

* * * * *